Oct. 27, 1959 H. H. HAMAN 2,909,922
DRILL TESTING DEVICE
Filed June 6, 1956 2 Sheets-Sheet 1
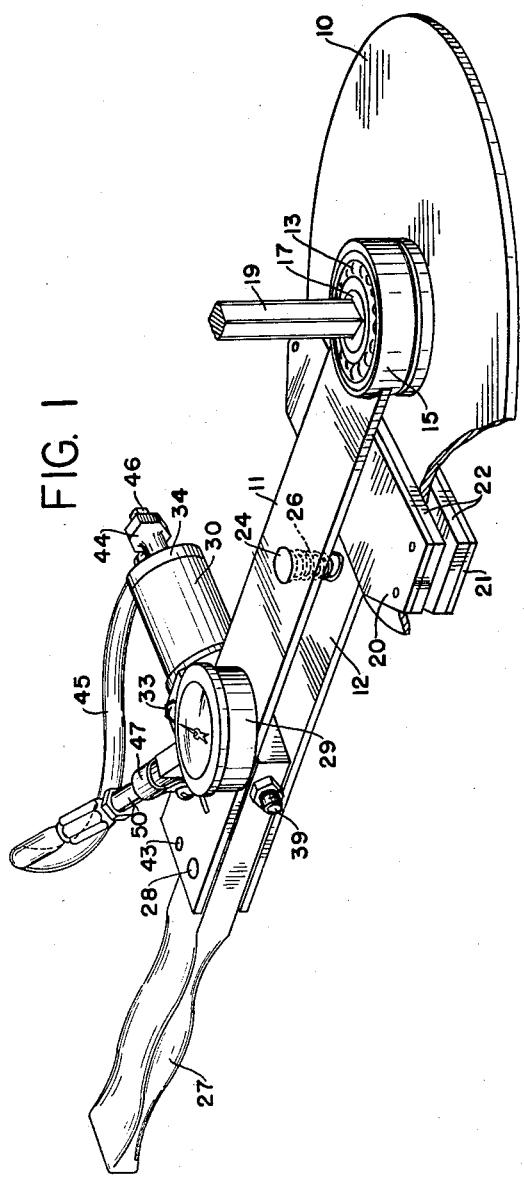
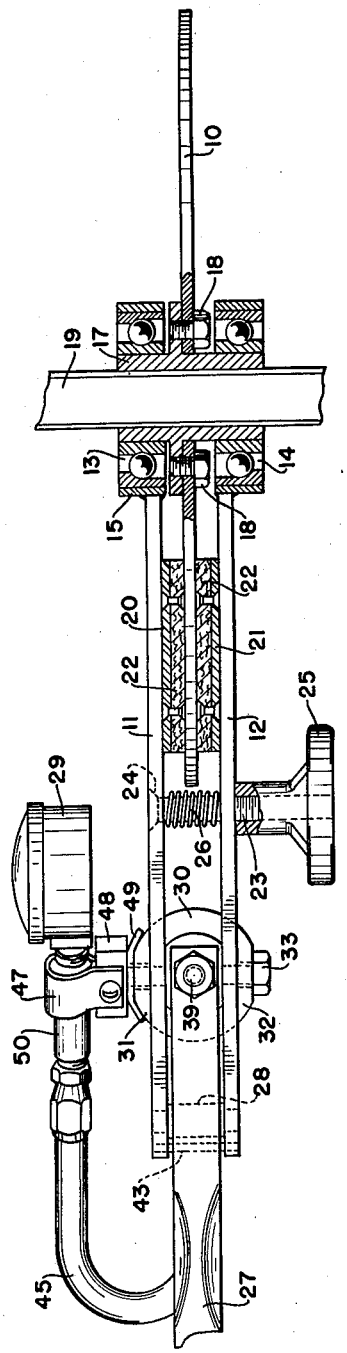
INVENTOR
HAROLD H. HAMAN
BY
ATTORNEYS

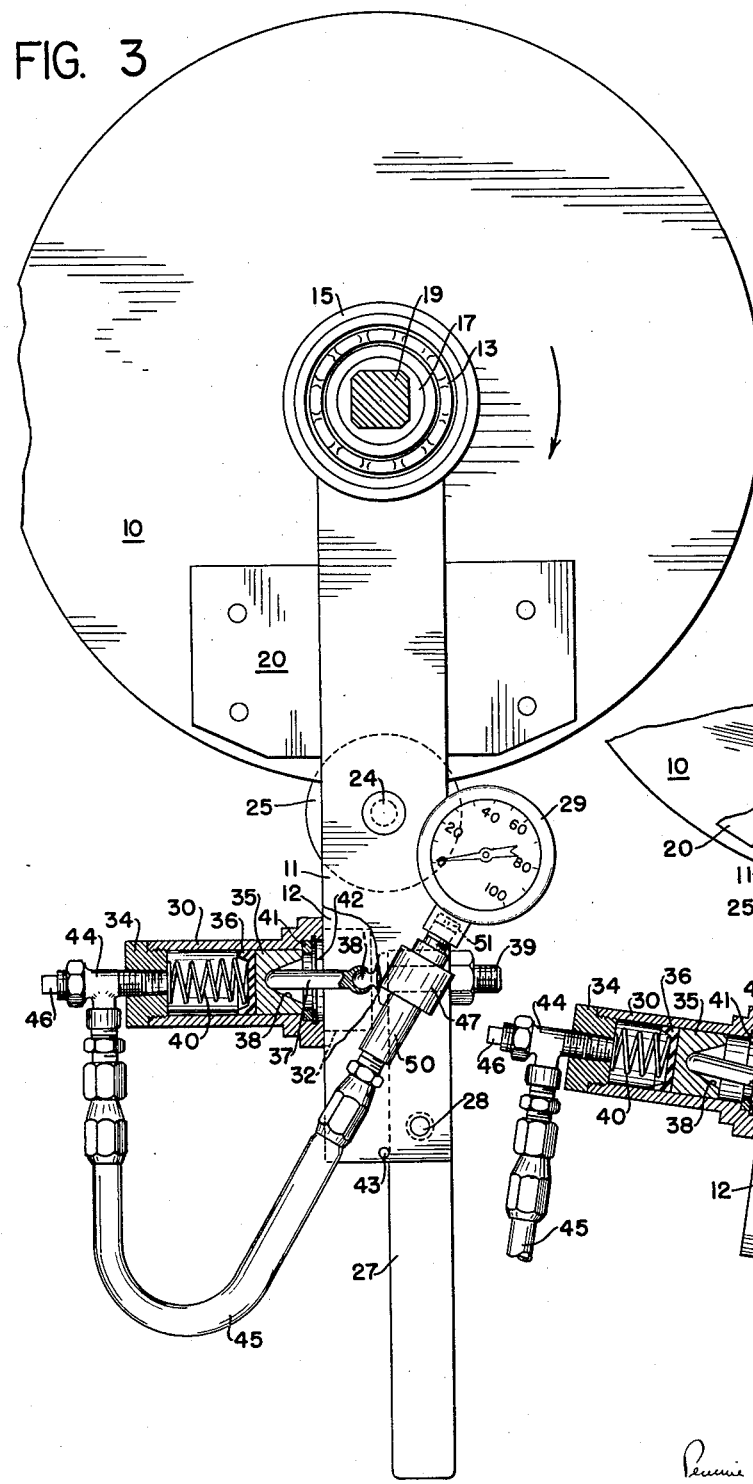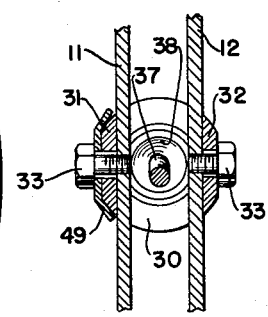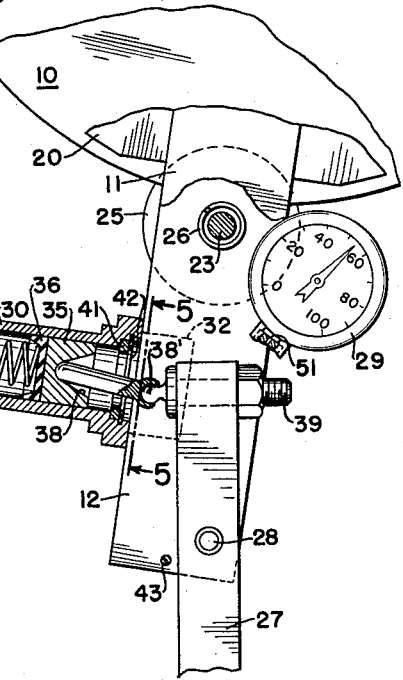

United States Patent Office 2,909,922
Patented Oct. 27, 1959

2,909,922

DRILL TESTING DEVICE

Harold H. Haman, Butte, Mont., assignor to The Anaconda Company, New York, N.Y., a corporation of Montana Application June 6, 1956, Serial No. 589,770

3 Claims. (Cl. 73—135)

This invention relates to testing devices, and is particularly directed to the provision of a portable device which is especially suited for testing the operating efficiency of percussion-type rock drills. The invention provides a portable testing device for such purpose which can be used in the shop for checking drills before and after they have been repaired, and which can easily be used in the field for the purpose of selecting the most efficient of a group of drills for day-to-day use.

Rock drilling operations frequently are carried out in difficultly accessible locations, or in locations that require transporting equipment substantial distances, often over rough terrain or through underground mine openings. It is important, therefore, that the rock drilling equipment be known to be in good working condition before carrying it to the scene of the drilling operation. Otherwise much effort and time may be wasted in transporting heavy drills long distances, only to find that they are not in working order, or that they operate considerably less efficiently than they should. Owing to wear, and other incidents of normal use, a drill which gives satisfactory performance on one day may perform unsatisfactorily the next. Hence testing of the drills each day, or each time they are carried to or from the place of use, is advantageous. A major overhaul of a pneumatic rock drill of the percussion type, including replacement of piston or cylinder or both, is an expensive job and it is therefore important, for reasons of economy, to be sure that maximum service has been received from a drill before such an overhaul is ordered. Periodic testing to check on serviceability of the drill is important from this standpoint. In the shop, after a drill has been repaired, it is important to know not only that it operates, but that it operates with full efficiency.

It is thus evident that a testing device capable of gauging the performance of rock drills is a valuable aid for checking on repair work, for selecting drills for use, and for determining with certainty when repairs are needed. It is also evident that since such a device finds much of its utility in the field, it is important that it be portable, light in weight, rugged, and reliable.

The present invention provides an improved testing device which is eminently suitable for all of the uses indicated above, and which fully meets all the criteria for portability and reliability. The new testing device comprises a supporting plate on which a brake disc is rotatably mounted. The disc is adapted to be rotated by the drill to be tested. A brake shoe is mounted on the supporting plate in position to engage the plate, and brake-applying means are provided for bringing the brake shoe into braking engagement with the disc. A supporting handle is pivotally attached to the supporting plate. Thus, the force exerted on the supporting plate by rotation of the disc while the brake shoe is in engagement with it reacts against a restraining force applied to the handle to move the handle pivotally relative to the supporting plate. A gauge is connected between the handle and the supporting plate for measuring such pivotal movement, and thereby the gauge indicates the magnitude of the braking force exerted on the disc during rotation thereof. The gauging means itself, or auxiliary means, confines the extent to which the handle may pivot to reasonable limits.

In a preferred embodiment of the new testing device, a spaced pair of supporting plates are provided, with the disc rotatably mounted between them at one end and the handle pivotally mounted between them at the other end. In this embodiment a pair of brake shoes are provided, one on each of the supporting plates and disposed directly opposite each other on each side of the disc. A clamp screw engaging the two supporting plates provides for forcing the brake shoes toward each other and into braking engagement with the disc.

In using this testing device, the disc is driven by the drill to be tested and the brake shoes are brought into braking engagement with the disc while the handle is firmly grasped to prevent the entire device from turning. The brake shoes are tightened against the disc until the drill perceptibly slows, and the magnitude of the pivotal movement of the handle relative to the supporting plate is then noted by taking a reading of the gauge. By comparing this gauge reading with the corresponding reading obtained when a drill known to be in good operating condition is tested, the performance of the drill under test can be determined.

A preferred embodiment of the new testing device is described below with reference to the accompanying drawings, in which Fig. 1 is a perspective of the new testing device, part of the disc being broken away to show both of the brake shoes;

Fig. 2 is an elevation, partially in section, of the testing device shown in Fig. 1;

Fig. 3 is a plan, partially in section, of the testing device shown in Figs. 1 and 2;

Fig. 4 is a plan similar to Fig. 3 of the handle and gauge, showing the device under load; and Fig. 5 is a section taken substantially along the line 5—5 of Fig. 4.

Referring first to Figs. 1 and 2, the new apparatus comprises a brake disc 10 rotatably mounted in a frame formed by a pair of spaced supporting plates 11 and 12. The rotatable mounting is formed by a pair of ball bearings 13 and 14 which are pressed into mounting rings 15 and 16 welded to the ends of the supporting plates 11 and 12 respectively. A hub 17 is attached by bolts 18 to the central portion of the disc 10, and is received within the bore of the inner races of the ball bearings. The hub 17 is formed with a substantially square axial opening of the proper size and shape to receive easily but fairly snugly the shank 19 of a drill rod. The drill rod is inserted into the chuck of a drill to be tested; and when the drill is operated the disc is rotated in the bearings 13 and 14.

A pair of brake shoes 20 and 21 are secured to the respective supporting plates 11 and 12 on opposite sides of the brake disc 10. Each brake shoe carries conventional brake lining 22 on the side toward the disc.

It is evident that by drawing the supporting plates 11 and 12 toward each other the brake shoes may be forced into braking engagement with the disc 10. For this purpose a threaded clamping bolt 23 extends through one of the supporting plates 12 with its head 24 engaging the other of these plates 11. An internally threaded handwheel 25 engages the end of the bolt which projects beyond the supporting plate. By screwing the handwheel down on the bolt, the supporting plates are forced toward each other and thereby the brake shoes may be clamped into braking engagement with the disc 10. The magnitude of the braking force exerted by the shoes against the disc may be regulated by the extent to which the handwheel is turned down on the bolt 23. A compression spring 26 surrounds the bolt 23 and urges the supporting plates 11 and 12 apart. Hence when the handwheel 25 is turned in the direction to back it off the bolt, the spring 26 acts to release the brake shoes from the brake disc.

A handle 27 is positioned between the supporting plates 11 and 12 at the end opposite the mounting for the brake disc. The handle is pivotally mounted on a pivot pin 28, so that when the disc 10 is rotated in a clockwise direction as indicated by the arrow and the brake shoes are in braking engagement with the disc, the resulting turning movement exerted on the supporting plates reacts against a restraining force applied to the handle so as to cause the handle to turn, or tend to turn, in a counterclockwise direction about the pivot pin.

The degree of rotation of the handle 27 about the pivot pin 28 is limited and the restraining force applied to it is measured by hydraulic means including a pressure gauge 29. These means, which are best shown in Figs. 3 to 5, comprise a hydraulic cylinder 30 fastened to the supporting plates 11 and 12. For fastening purposes, the base of the cylinder is provided with a pair of lugs 31 and 32 which overlie the outer faces of the supporting plates 11 and 12 respectively, as best shown in Figs. 2 and 5. These lugs are securely attached by bolts 33 to the respective supporting plates. The cylinder is mounted in place near the inner end of the handle 27, and its body serves incidentally as a spacer to prevent clamping of the supporting plates against the handle (and thus to interfere with the freedom of the handle to pivot on its mounting pin 28) when the handwheel 25 is screwed down to apply the brake shoes to the disc 10.

The outer end of the cylinder is closed by a head 34. A piston 35 within the cylinder is sealed tightly against it by a flexible piston cup 36. The piston is linked to the inner end of the handle 27 by means of a push rod 37, one end of which seats in a deep, generally conical recess 38 formed in the underside of the piston, and the other end of which is provided with a spherical socket. This socket receives a ball head 38' formed on a thrust bolt 39 which is fastened to the inner end of the handle 27. The socket is peened over beyond the center of the ball so that it is not easily separated therefrom. A compression spring 40 within the cylinder urges the piston at all times toward the push rod. A retaining ring 41 held in place by a ring spring 42 seated in a groove prevents the spring 40 from pushing the piston from the cylinder. A stop pin 43 may be provided to limit pivotal motion of the handle in the clockwise direction (as viewed in Fig. 3) so that the push rod will not become dislodged from the recess 38 in the piston.

A T fitting 44 is threaded into the cylinder head 34, and a flexible hose 45 provides for connecting the pressure gauge 29 through the T to the interior of the cylinder. A plug 46 normally closes the T, but this plug can be removed to fill the cylinder and hose with hydraulic fluid when required. The pressure gauge is held firmly in place, and kept facing in a convenient direction, by a clamp 47 (Fig. 2) which is bolted to a mounting block 48. The mounting block in turn is fastened to a bracket 49 which is held in place under the head of one of the bolts 33 by which the cylinder lug 31 is attached to the supporting plate 11.

In order to minimize the effect of vibration on the pressure gauge during testing of a drill, the mounting block 48 is preferably of a resilient rubber composition, and a soft sponge rubber sleeve is interposed between the clamp 47 and the gauge mounting nipple 50. Also, to minimize shock on the gauge mechanism, an orifice tube or plate 51 may be mounted at the inlet to the gauge to meter the flow of hydraulic fluid into the gauge.

The above-described testing device is used by inserting the shank 19 of a percussion drill rod in the chuck of a drill to be tested and introducing it into the axial opening in the hub 19 of the brake disc 10. The drill is then set in motion, thereby rotating the disc in the clockwise direction indicated by the arrow. With the handle 27 grasped firmly in the hand, and with the pressure gauge facing up for ready observation, the device will be substantially in the position shown in Fig. 3. The handwheel 25 is then screwed down on the bolt 23. As the brake shoes 20, 21 are thereby brought into braking engagement with the rotating disc, the force tending to turn the entire device is resisted by the hand holding the handle. Thereupon the handle tends to rotate counterclockwise about its mounting pivot 28, and thereby acts through the push rod 37 to force the piston into the cylinder 30. This movement registers as an increase in pressure which is indicated by the pointer of the pressure gauge 29. The handwheel is tightened until the drill under test slows down perceptibly, and the reading on the pressure gauge at that moment is noted. The testing device will now be substantially in the position shown in Fig. 4. Then the handwheel is loosened again, releasing the brake shoes from the disc. The observed reading is compared with the reading obtained when a drill known to be in good operating condition is similarly tested, and by such comparison the operating efficiency of the drill under test is determined.

It is not necessary to make a comparison with a drill in good condition every time a drill in unknown condition is tested. It is only necessary to test the good drill once and note the pressure on the gauge when the drill has slowed perceptibly in order to calibrate the device for future use. Thereafter, when a drill is tested, the pressure gauge reading may be compared with the previously noted calibrating reading. An empirical minimum pressure reading for drills in acceptable operating condition may be established from a series of readings on different drills and a comparison of such readings with performance of the drill in use. Once such empirical minimum has been established, then all drills which upon testing give a higher pressure reading can be passed as in acceptable operating condition, and all drills which give a lower pressure reading can be sent to the repair shop.

It is apparent that the new testing device is mechanically simple and in its preferred embodiment is rugged enough for use under all ordinary conditions prevailing in the field where rock drilling operations are carried out. The device is physically not large, and can easily be made light enough for carrying with such other tools as are customarily taken into the field. And despite its ruggedness and simplicity, it can be relied upon to give consistent and reproducible test readings. Its use in the field will minimize the amount of drilling time lost due to placing inoperative or inefficient drills in the hands of the drilling crew, and at the same time will insure that maximum service is obtained from each drill before it is subjected to a costly major overhaul. In the shop the new testing device can be used conveniently to check on the condition of each drill prior to repair work, and to check on the performance of the drill after the repair work is completed.

The new testing device is especially suitable for testing pneumatic drills of the percussion type, for it is not subject to being damaged by the repeated hammer blows to which the drill rod shank 19 is subjected when such drills are tested, and its ability to yield reliable test results is not thereby impaired. It is apparent, however, that the utility of the device is not limited to testing such drills—rather, it can be used with advantage in testing drills of all types, in the field and in the shop.

I claim:

1. A portable testing device adapted for testing percussion-type drills comprising a supporting plate, a brake disc having a drill receiving hub rotatably mounted on said supporting plate and adapted to be rotated by a drill to be tested, a brake shoe mounted on said supporting plate in position to engage said disc, brake applying means for bringing said brake shoe into braking engagement with said disc, a supporting handle pivotally secured to said supporting plate, whereby the force exerted on the supporting plate by rotation of the disc when the brake shoe is in engagement therewith reacts against a restraining force applied to the handle to move the handle pivotally relative to the supporting plate, and a gauge connected between the handle and the supporting plate for measuring such restraining force, whereby said gauge indicates the braking force exerted on the disc during rotation thereof.

2. A portable testing device adapted for testing percussion-type drills comprising a pair of spaced supporting plates, a brake disc rotatably mounted between said plates and adapted to be rotated by a drill to be tested, a pair of brake shoes mounted one on each side of said disc and secured to said supporting plates, a clamping screw engaging the supporting plates for forcing said brake shoes together into braking engagement with the disc, a supporting handle pivotally mounted between said plates beyond the periphery of the disc, whereby the force exerted on the supporting plates by rotation of the disc when the brake shoes exert a braking force on the disc reacts against a restraining force applied to the handle to move the handle pivotally relative to the supporting plates, and a gauge connected between the handle and the supporting plates for measuring such restraining force, whereby said gauge indicates the braking force exerted on the disc during rotation thereof.

3. A portable testing device adapted for testing percussion-type drills comprising a pair of spaced supporting plates, a brake disc rotatably mounted between said plates adjacent one end thereof, a hub secured centrally to said disc and adapted to receive a drill rod driven by a drill to be tested, a pair of brake shoes mounted one on each side of said disc and secured to said supporting plates, a clamping screw engaging the supporting plates for forcing said brake shoes toward each other into braking engagement with the disc, a supporting handle pivotally mounted between said plates adjacent the end thereof remote from the disc, whereby the force exerted by rotation of the disc when the brake shoes are in braking engagement with the disc reacts against a restraining force applied to the handle to move the handle pivotally with respect to the supporting plates, and means for indicating the magnitude of such restraining force comprising a hydraulic cylinder secured to said supporting plates, a piston within said cylinder, a linkage connecting said piston to said handle, whereby pivotal motion of the handle relative to the supporting plates causes the piston to move in the cylinder, and a pressure gauge connected to the cylinder for indicating the pressure of hydraulic fluid therein.

References Cited in the file of this patent
UNITED STATES PATENTS

| | | |
|---|---|---|
| 1,576,465 | Pryce | Mar. 9, 1926 |
| 1,711,866 | Williams | May 7, 1929 |
| 2,004,950 | Jenkins | June 18, 1935 |
| 2,063,622 | Pfeiffer | Dec. 8, 1936 |
| 2,679,160 | Welch | May 25, 1954 |